United States Patent

Iijima et al.

[15] 3,668,638

[45] June 6, 1972

[54] PATTERN PROCESSING SYSTEMS

[72] Inventors: Taizo Iijima, Tokyo; Issei Yamazaki, Urawa; Shunji Mori, Chiba; Hiroshi Genchi, Kawasaki, all of Japan; Sumio Katsuragi, deceased, late of Tokyo, Japan by Kaoru Katsuragi, heiress

[73] Assignees: Kogyo Gijutsuin, an authority of the Japanese Government, Tokyo-to; Tokyo Shibaura Denki Kabushiki Kaisha, Kawasaki-shi, Japan; part interest to each

[22] Filed: Nov. 2, 1970

[21] Appl. No.: 86,145

[30] Foreign Application Priority Data

Nov. 5, 1969 Japan....................................44/88107
Nov. 5, 1969 Japan....................................44/88108

[52] U.S. Cl.....................................................340/146.3 H
[51] Int. Cl........................................................G06k 9/04
[58] Field of Search..............340/146.3 S, 146.3 H, 146.3 R, 340/146.3 Q, 146.3 T, 146.3 AE

[56] References Cited

UNITED STATES PATENTS 3,341,814 9/1967 Chow...............................340/146.3 S

*Primary Examiner*—Thomas A. Robinson
*Attorney*—Robert E. Burns and Emmanuel J. Lobato

[57] ABSTRACT

Each input pattern supplied for the purpose of identification is translated through light energy into an electrical signal which is then quantized and stored in a two-dimensional register. The quantized values in the register, consisting of binary digits 0 (representing a white spot) and 1 (a black spot), may be further subjected to a process of a blurring operation and/or that of line width normalization. The pattern blurring operation is effected by means of sampling circuits with their resistances preadjusted at specific values. The latter process is carried out by means of a line width normalization circuit capable of detecting the line width of sampled pattern obtained by the above sampling procedure and of feeding back the results of the detection of the two-dimensional register or the quantizing circuit for the readjustment, if necessary, of the line width into a desired range.

9 Claims, 10 Drawing Figures

PATTERN PROCESSING SYSTEMS

This invention relates to pattern processing systems, and more particularly to systems wherein patterns such as letters, numerals and other symbols are processed into optimal form for identification with preselected reference patterns.

Heretofore, in the field of pattern identification, an input pattern has generally been translated through light energy into an electrical signal which has then been sampled so as to represent the pattern at a finite number of appropriately spaced points thereof. For identification with a set of preselected reference patterns, those appropriately sampled values have been introduced into a plurality of weighting/summing circuits, or summing amplifiers according to the conventional technology, used prevalently in electronic analog computation (the term "weighting/summing circuits" is used in this specification because they respectively "weight" and then take sums of the values introduced). It will be obvious that the width between such sampling points should be minimized purely for the purpose of faithful representation of an input pattern. This, however, results in the fact that a great number of sample values obtained resultantly for each input pattern increase the input number of the weighting/summing circuits provided in parallel arrangement with a pattern identification circuit. Too close sampling points are therefore undesirable in view of the expensive and large sized equipment required.

Overly coarse sampling points, on the other hand, bring about the fact that a sampled pattern is subject to considerable deformations depending upon change in the relative positioning of the input pattern and the latticed sampling points thereof. Such deformations are generally called "sampling errors" by the specialists. These sampling errors affect the outputs of the weighting/summing circuits, too, into which are introduced the values representative of the aforementioned sampled pattern. By this time the errors are usually diminished to some extent by virtue of the characteristic operations of the weighting/summing circuits, but not necessarily to a negligible degree in case the input pattern has been sampled at too coarsely spaced points as above.

The present invention has been made on the basis of the discovery that the errors included in said weighting/summing of said sampled pattern are eliminable by adequately blurring each input pattern.

More specifically, according to the concepts of the invention, each input pattern is blurred using two-dimensional sampling circuits and a weighting coefficient to produce a result as close as feasible to the so-called Gaussian distribution. Further the degree of such blurring has to be set at no less than a limit value determined with relation to the line widths of input patterns and the space between their sampling points. Since an overly great degree of confusion is liable to cause the deterioration of discriminating power among the input patterns to be differentiated from one another, in practice the degree should desirably be set not too far above the aforesaid limit value. It is usually the ohmic values of the resistances provided in sampling circuits of a pattern processing system that determine the degree of blurring, so that the degree can hardly be adjusted to meet the varied line widths of input patterns. Accordingly it is preferable that the line widths be previously "-normalized" into a prescribed range.

Similar normalization or stabilization of input patterns based upon the feedback of the detected line density (not the line width) of each input pattern, is effected in the stage of waveform processing, by detecting the peak amplitudes of the output wave of the photoelectric converter. On the other hand, the prior art based upon the detection of line widths of input patterns to achieve the same purpose includes, for example, a process which features the tracking of the line or lines of each input pattern or a process wherein the so-called combinational logic circuits are utilized to determine if, with regard to each input pattern sampled at points in latticed arrangement, the points adjacent arbitrarily selected points on a line of the input pattern are located on the same line or not. According to the foregoing conventional normalization process of the output waveform of the photoelectric converter, however, the patterns which are essentially two-dimensional objects are dealt with as one-dimensional information, as it were, so that no clear distinction can be made between the signals affected by noise, shading, etc. and the signals obtained when the lines constituting the input patterns have been scanned. And the aforementioned prior art detection processes based upon the detection of line widths of input patterns necessitate complex logical operations which can be carried out only by considerably large sized equipment and which practically make impossible the high speed reading of the input patterns supplied.

It is accordingly a primary object of the present invention to provide a novel pattern processing system wherein patterns such as letters, numerals and other symbols are processed into form optimal for identification purposes.

Another object of the invention is to provide a pattern processing system wherein the varied line widths of the patterns are uniformized through a process of "normalization" into a prescribed range for correct and efficient identification.

Still another object of the invention is to provide a pattern processing system wherein each input pattern is blurred in such a manner that the errors included in said sampled pattern are virtually eliminated through the blurring operation.

Yet another object of the invention is to provide a pattern processing system wherein respective input patterns have their line widths normalized into a prescribed range to keep a value of the blurring operation of the pattern constant.

Yet a further object of the invention is to provide a pattern processing system so made that comparatively simple equipment is required to effect high speed operations with parallel arrangement of sampling circuits.

A yet further object of the invention is to provide a pattern processing system so made that the varied line widths of input patterns can be unfailingly detected and normalized in their initial two-dimensional form without any substantial influence of noise.

A further still object of the invention is to provide a pattern processing system so made that fluctuations in the line width of input patterns and the possible influences of unstable factors present in a photoelectric converter in use are sufficiently compensated for, so that the highly reliable reading of the input patterns is ensured.

Still a further object of the invention is to provide a pattern processing system so made that it tolerates the processing of considerably inferior print quality, whether they may be poorly handwritten or typewritten.

With these objects in view and the other objects hereinafter set forth, the invention will now be described in more detail, with reference made to the accompanying drawings, which, however, are meant only to illustrate and not to limit the invention, and in which.

Figure 1:
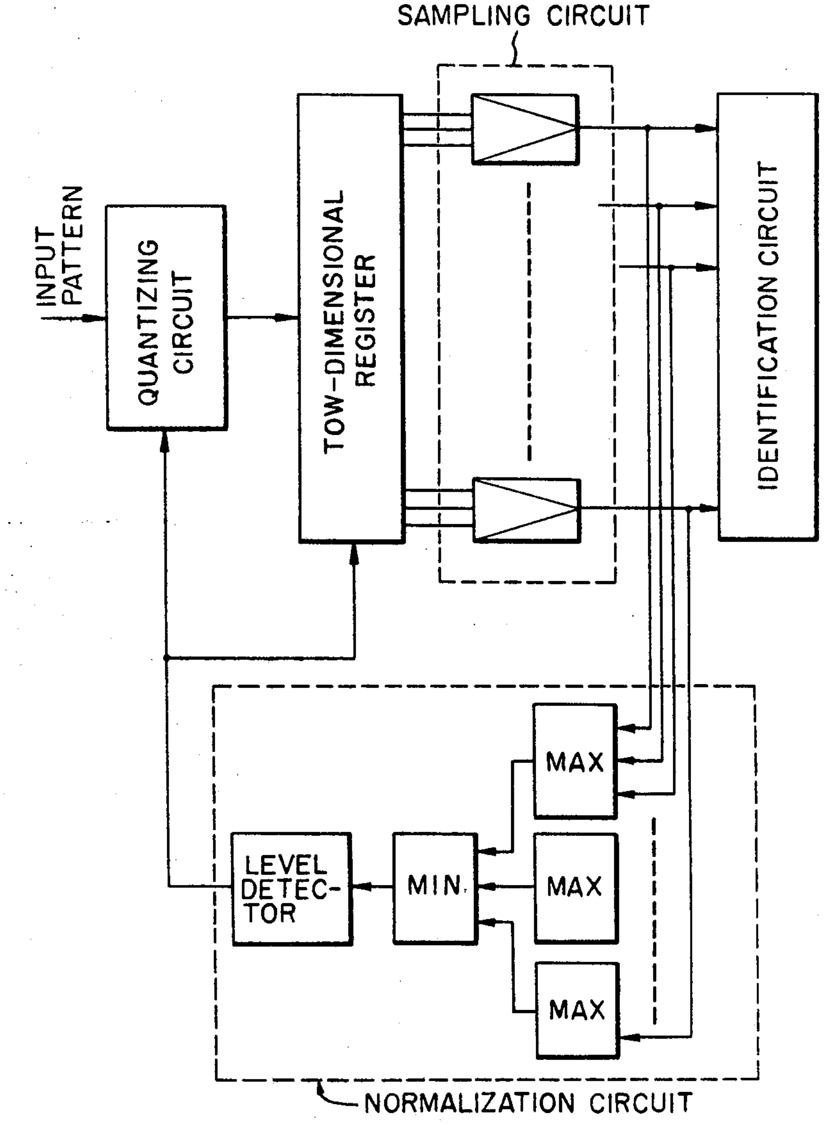
FIG. 1 is a schematic block diagram showing an exemplary configuration of a pattern processing system of the present invention.

Referring now to FIG. 1, which shows the overall configuration of a pattern processing system in accordance with the present invention, an input pattern is translated through light energy into an electrical signal by means of a photoelectric converter. The signal is then quantized by means of a quantizing circuit and is temporarily stored in a two-dimensional register. The quantized values in the two-dimensional register, representative of the input pattern supplied, are sampled by means of a plurality of sampling circuits which perform the aforesaid pattern blurring operation in accordance with the concepts of the invention detailed in the following. These sampled values are then fed in a suitable manner into means for identifying said pattern from weighting/summing of said sampled pattern, and also, as shown in the drawing, into a line width normalization circuit (still to be described in detail) for normalization, if necessary, of the line width of the pattern stored as above in the two-dimensional register.

Description will now be given in detail upon the principles of the aforementioned blurring operation of input patterns in accordance with the present invention. Let $f(x)$ be a pattern obtained by blurring pattern $f_o(x)$ by a quantity $\sigma$. The following theoretical analysis is held in the one-dimensional case, but the results are easily expanded by the two-dimensional case with the following solutions. This blurred pattern $f(x)$ will be defined by $$f(x)=\frac{1}{\sigma}\int_{-\infty}^{\infty}\phi\,\frac{x-x'}{\sigma}\,f_0(x)'dx' \qquad (1)$$

And a function $\phi(\xi)$ of blurring is given by $$\phi(\xi)=\frac{1}{\sqrt{2\pi}}\,\theta^{-\xi^2/2},\ (-\infty<\xi<\infty) \qquad (2)$$

Hence the relation $$\int_{-\infty}^{\infty}\phi(\xi-\xi')d\xi=1\,(-\infty<\xi'<\infty) \qquad (3)$$

is established irrespective of the values of $\xi'$.

so that it may be seen that formula (4) assumes a value 1 at the limit where $\beta\rightarrow 0$, irrespective of the value of $\xi'$. As may be surmised from the formula (4), the function $\Phi(\xi',\beta)$ satisfies the relation $$\Phi(\xi'+2\beta,\beta)\equiv\Phi(\xi',\beta) \qquad (6)$$

so that it is a periodic function having a period $2\beta$. Also $\Phi(\xi',\beta)$ is the even function of $\xi'$ since the relation $$\Phi(-\xi',\beta)\equiv\Phi(\xi',\beta) \qquad (7)$$

is obtainable from the foregoing formula (6) combined with the fact that $\phi(\xi)$ is the even function of $\xi$. Accordingly, the relation $$\Phi(\beta+\xi',\beta)\equiv\Phi(\beta-\xi',\beta) \qquad (8)$$

is obtainable from the formulas (6) and (7). Hence it is seen that the function $\Phi(\xi',\beta)$ assumes extreme values when $\xi'=0$ and when $\xi'=\beta$.

Further, as may be verified by the formulas (2) and (4), the function $\Phi(\xi',\beta)$ decreases monotonically when $-\beta<\xi'<0$ and increases monotonically when $0<\xi'<\beta$, so that it obviously assumes values in the range defined by $$\Phi(0,\beta)\leqq\Phi(\xi',\beta)\leqq\Phi(\beta,\beta) \qquad (9)$$

Figure 3:
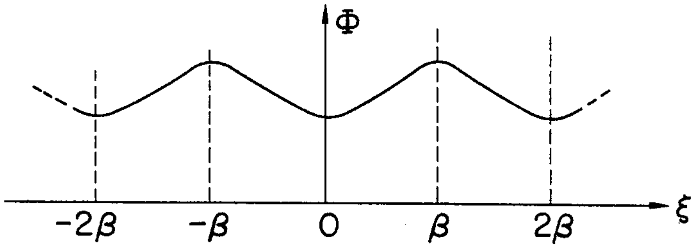
FIG. 3 is a graph in which is plotted the curve of a function $\Phi$ against $\xi$.
Figure 4:
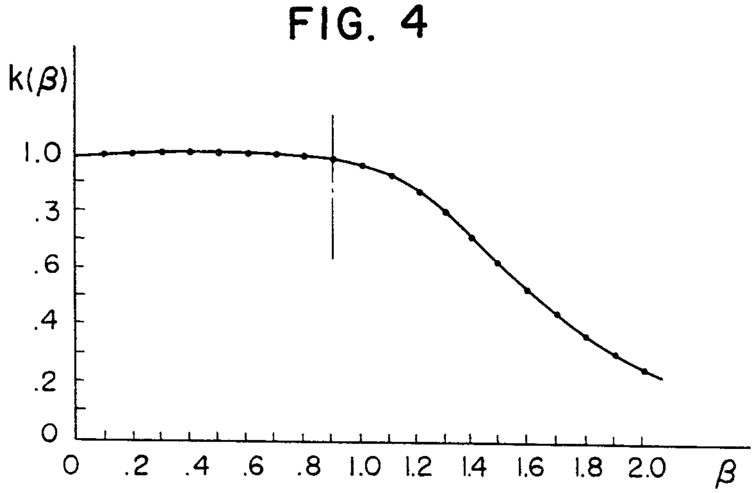
FIG. 4 is a graph in which is plotted the curve of $k(\beta)$ against $\beta$.
Figure 5:
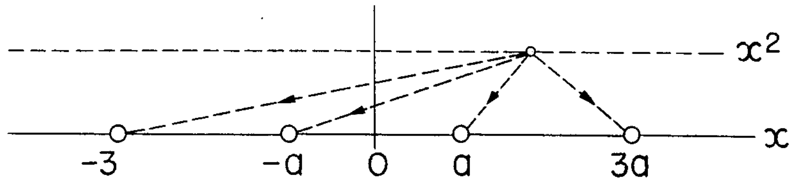
FIG. 5 is a graph plotted to show the contribution of the blurring of point $x^2$ to point $x$.

FIG. 3 gives the graph of the function $\Phi(\xi',\beta)$ plotted approximately.

In order to demonstrate the degree of constancy that may be held by the function $\Phi(\xi',\beta)$ against various values assumed by $\xi'$, consider a function $k(\beta)$ which is defined by $$k(\beta)\equiv\Phi\ (0,\ \beta)/\Phi\ (\beta,\beta). \qquad (10)$$

There is obtained, from this formula (10) in combination with the formula (4), the relation $$K(\beta)=\frac{\sum_{n=-\infty}^{\infty}e^{-\frac{(2n+1)^2}{2}\beta^2}}{\sum_{-\infty}^{\infty}e^{-2n^2\beta^2}} \qquad (11)$$

Tabulated below are the results of the computations of the values of $k(\beta)$ according to the formula (11), set at progressive values within the range defined by $0\leqq\beta\leqq 2$.

| $\beta$ | 0.1 | 0.2 | 0.3 | 0.4 | 0.5 | 0.6 | 0.7 | 0.8 | 0.9 | 1.0 |
|---|---|---|---|---|---|---|---|---|---|---|
| $k(\beta)$ | 1.000 | 1.000 | 1.000 | 1.000 | 1.000 | 1.000 | 1.000 | 0.999 | 0.993 | 0.978 |

| $\beta$ | 1.1 | 1.2 | 1.3 | 1.4 | 1.5 | 1.6 | 1.7 | 1.8 | 1.9 | 2.0 |
|---|---|---|---|---|---|---|---|---|---|---|
| $k(\beta)$ | 0.935 | 0.879 | 0.805 | 0.722 | 0.636 | 0.547 | 0.472 | 0.395 | 0.327 | 0.270 |

Now, in order to approximately represent the integration of the formula (3) in the form of a summation of the functions at equally spaced ($2\beta$) points (wherein the spacing is assumed to be $2\beta$), consider a function $\Phi(\xi',\beta)$ which is defined by $$\Phi(\xi',\beta)\equiv 2\beta\sum_{n=-\infty}^{\infty}\phi((2n+1)\beta-\xi') \qquad (4)$$

Then, $$\lim_{\beta\rightarrow 0}\Phi(\xi',\beta)=\int_{-\infty}^{\infty}\phi(\xi-\xi')d\xi=1 \qquad (5)$$

Tolerating errors of no more than 0.7 percent, it can be derived from the foregoing table that $$\Phi(\xi',\beta)\fallingdotseq 1,\qquad (0\leqq\beta<0.9) \qquad (12)$$

Discussed in the following is the proper determination of the spacings of pattern sampling points for a uniformized blurring rate throughout each input pattern. Let it be assued that a pattern $f(x)$ blurred with a quantity $\sigma$, as defined previously by the formula (1), is represented by equally spaced points of $$X_n=(2n+1)a,$$
$$(n=0,\pm1,\pm2,\text{-----}) \qquad (13)$$

where the spacing of two adjacent sampling points is assumed to be $2a$. Since then the rate of contribution of $f_o(x')$ at point $x'$ to the pattern $f(x_n)$ given by points $x_n$ is $$\frac{2a}{\sigma}\,\phi\left(\frac{X_n-X'}{\sigma}\right)$$

the rate of contribution of the $f_0(x')$ to the pattern $\{f(x_n)\}$ at all the points given by $\{x_n\}$ is defined by $$\Phi\left(\frac{x'}{\sigma},\frac{a}{\sigma}\right)=\frac{2a}{\sigma}\sum_{n=-\infty}^{\infty}\left\{(2n+1)\frac{a}{\sigma}-\frac{x'}{\sigma}\right\} \qquad (14)$$

Accordingly, from the formula (12), the value of $a$ has to be in the range defined by $$0 \leq a<0.9\sigma \qquad (15)$$

if the contribution rate of blurring $\Phi(x'/\sigma\ ,\ a/\sigma)$ is to be regarded as being constant without relation to point $x'$. In other words, the spacing $(2a)$ between sampling points of the pattern have to be each less than $1.8\sigma$. This provides a definite criterion for the uniformized contribution of the values at the respective points of a given pattern $f_o(x')$ to the sample values defining $\{f(x_n)\}$ in a pattern sampling procedure.

Now, in order to equivalently convert the integration required for obtaining the inner product of a pattern $f(x)$ and a function $W(x)$ of "weighting" into a simplified form of summation, suppose that these pattern $f(x)$ and function $W(x)$ are respectively given by $$f'(x)=\frac{1}{\sigma_1}\int_{-\infty}^{\infty}\phi\left(\frac{x-x'}{\sigma_1}\right)f_0(x)'dx'$$

$$W(x)=\frac{1}{\sigma_2}\int_{-\infty}^{\infty}\phi\left(\frac{x-x''}{\sigma_2}\right)W_0(x'')dx'' \qquad (16)$$

Then the inner product $(f,W)$ of $f(x)$ and $W(x)$ is $$(f,W)\equiv\int_{-\infty}^{\infty}f(x)W(x)dx=\int_{-\infty}^{\infty}\int_{-\infty}^{\infty}f_0(x')W_0(x'')dx'dx''$$

$$\cdot\frac{1}{\sigma_1\sigma_2}\int_{-\infty}^{\infty}\phi\left(\frac{x-x''}{\sigma_2}\right)\phi\left(\frac{x-x'}{\sigma_1}\right)dx \qquad (17)$$

Now there can be obtained the identical equation $$\frac{1}{\sigma_1\sigma_2}\int_{-\infty}^{\infty}\phi\left(\frac{x-x'}{\sigma_1}\right)\phi\left(\frac{x-x''}{\sigma_2}\right)dx=\frac{1}{\sqrt{\sigma_1^2+\sigma_2^2}}\,\phi\left(\frac{x'-x''}{\sqrt{\sigma_1^2+\sigma_2^2}}\right)$$

$$\cdot\frac{1}{\sigma_3}\int_{-\infty}^{\infty}\phi\left(\frac{x-x_3}{\sigma_3}\right)dx \qquad (18)$$

where $$\sigma_3=\frac{\sigma_1\sigma_2}{\sqrt{\sigma_1^2+\sigma_2^2}},\qquad x_3=\frac{\sigma_1^2x''+\sigma_2^2x'}{\sigma_1^2+\sigma_2^2} \qquad (19)$$

Accordingly, in order for the integration on the right side of the equation of the formula (18) to be rewritten as $$\frac{1}{\sigma_3}\int_{-\infty}^{\infty}\phi\left(\frac{x-x_3}{\sigma_3}\right)dx \doteqdot \phi\left(\frac{x_3}{\sigma_3},\frac{a}{\sigma_3}\right) \qquad (20)$$

there must be satisfied the relation, from the formula (12)

$$0\leq a\,\frac{\sqrt{\sigma_1^2+\sigma_2^2}}{\sigma_1\sigma_2}=a\sqrt{\frac{1}{\sigma_{1_2}^2}+\frac{1}{\sigma_1^2}}<0.9 \qquad (21)$$

Now that the integration of the formula (17) may be given in the form of summation, with $x$ in the formula (17) taken over by equally spaced points, the same inner product is obtainable according to $$(f,W)=2a\sum_{n=-\infty}^{\infty}f((2n+1)a)W((2n+1)a) \qquad (22)$$

Especially when $\sigma_1=\sigma_2=\sigma$, then the formula (21) may be rewritten as $$0 \leq a < 0.9/\sqrt{2}\sigma=0.687 \qquad (23)$$

When a pattern having a line width $2b$ is given by $f_o(x')$, $f(x)$ may be regarded as a pattern blurred by a quantity $b/1.4$ from the ideal thin line pattern. Hence a quantity $\sigma_o$ by which $f_o(x')$ is additionally blurred to $f(x)$ has to be, considering $\sigma$ which satisfies the formula (23), in the relation: $\sigma^2=\sigma_o^2+(b/1.4)^2$. Substituting $\sigma$ obtained from the above relation into the formula (23), the relation $$0 \leq a \leq 0.637\sqrt{\sigma_o^2+(b/1.4)^2} \qquad (24)$$

is obtained [if $b=1.4\,\sigma_o$, then (24)≒(15)].

According to the well known sampling theorem, it is not permitted to set the spaces between sampling points as coarsely as described in the present invention. However, assuming that the pattern identification circuits are composed of the combination of inner product operation as shown in formula (17), it is considered sufficient if only the result of inner product operations is calculated with necessary accuracy. From this point of view, the value of the space between sampling points can be coarser than that required on a basis of the conventional sampling theorem. Formula (24) gives quantitatively a range of space between sampling points in the above-mentioned sense.

As a practical illustration of the above outlined concepts of the invention, consider a pattern which is quantized and stored on a matrix as black and white spots at 0.1 mm intervals (the black spots represented by binary digit 1 and the white spots by 0). Normal line width usually ranges from 0.3 mm to 0.5 mm. If these values representing the pattern are to be sampled at a sampling point spacing of every three bits in both vertical and horizontal directions, the aforementioned functions of blurring could be obtained at 21 points of a 5 × 5 square, four other points being removed from the corners, as in FIG. 2. To satisfy equation (24), $\sigma_o$ may be selected to be 1.7 and corresponding weighting coefficients of blurring are set forth also in FIG. 2.

Figure 2:
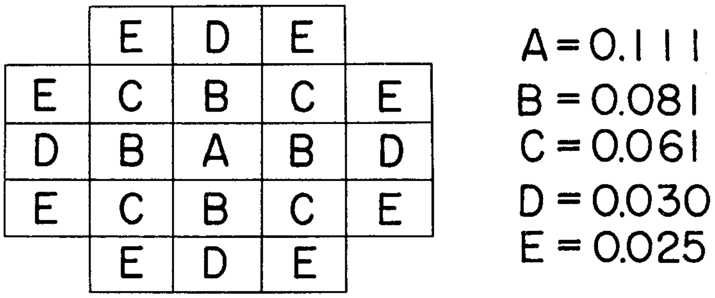
FIG. 2 is an explanatory diagram showing an example of the blurring operation of an input pattern in accordance with the concepts of the present invention.
Figure 6:
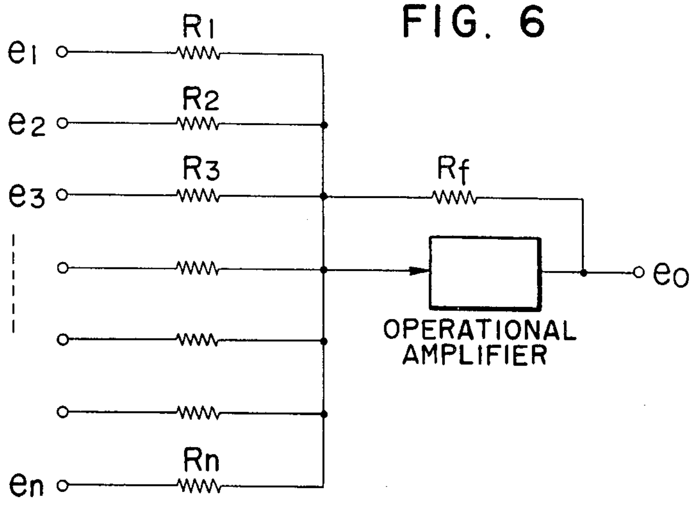
FIG. 6 is a diagram of an example of a sampling circuit for use in obtaining blurred patterns in accordance with the concepts of the present invention.

Practically, the concept of the present invention illustrated in their simplest form in FIG. 2 may be carried out electrically by means of the sampling circuit given by way of example in FIG. 6. While this example is, in fact, the well known summing amplifier comprised of an operational amplifier and resistances as in the drawing, the above concepts may be implemented by other means such as, specifically, a plurality of digital adders, the inputs of which are weighted respectively by blurring operation.

Thus, by locating a center point A of blurring (shown in FIG. 2 by way of example) at every three bits of the aforesaid quantized pattern in both vertical and horizontal directions, the sampled pattern obtained after the blurring operation will have its sampling points reduced to 1/9 in number.

Figure 7:
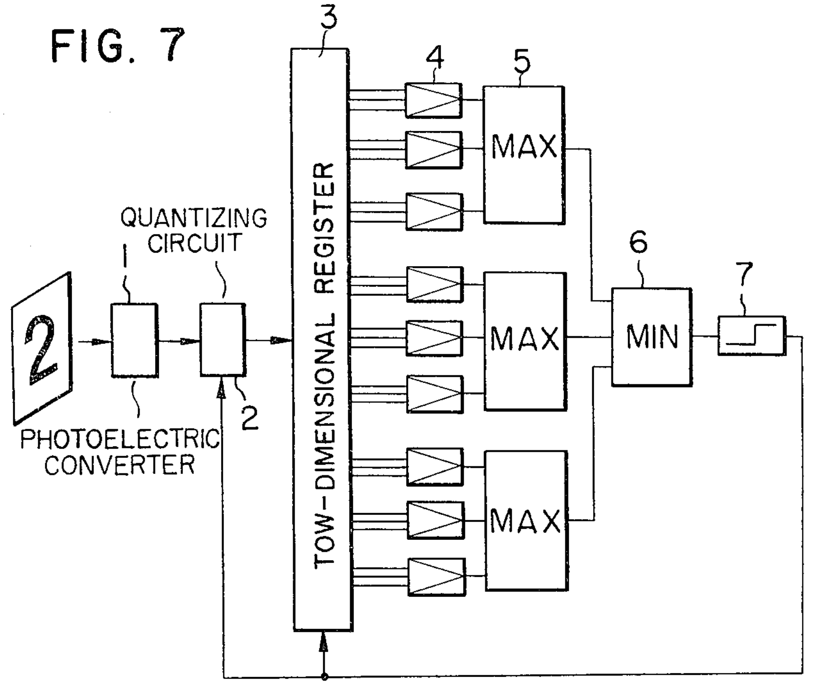
FIG. 7 is a block diagram of an example of the line width normalization circuit given in the pattern processing system of FIG. 1.

Referring now to FIG. 7, showing an example of a line width normalization circuit in accordance with the present invention, the reference numeral 1 indicates a photoelectric converter capable of scanning each input pattern and translating its density into electrical signals. The output of this photoelectric converter is sampled and quantized by means of a quantizing circuit 2 into values representing binary digit 1 or 0 according to whether each sampled value exceeds or falls short of a predetermined level. The output of this quantizing circuit 2 is temporarily stored in a two-dimensional register 3. By the foregoing means, each input pattern is converted into a quantized pattern and stored in the two-dimensional register 3. A plurality of sampling circuits 4, or the summing amplifiers according to the conventional technology, are supplied with input signals from equal-sized areas respectively surrounding definite points of the quantized pattern in the two-dimensional register 3. These input signals supplied to each sampling circuit are respectively "weighted," or multiplied by constant coefficients, and then added together. A plurality of groups of such sampling circuits are provided as, for example, in FIG. 7. The aforesaid points at the centers of the aforesaid equal-sized areas from which input signals are supplied to the sampling circuits 4 are in latticed arrangement, with the latticed points running vertically and horizontally, on the two-dimensional register 3, as illustrated by way of example in FIG. 8. In this particular configuration of FIG. 7, the sampling circuits are equally divided into three groups corresponding to three horizontally extending regions A, B and C shown in FIG. 8, and three maximum value detecting circuits 5 are provided correspondingly to the three groups of the sampling circuits in order to detect a maximum value in the outputs of the sampling circuits in each group. A minimum of the outputs of the three maximum value detecting circuits is detected by means of a minimum value detecting circuit 6 of FIG. 7.

Figure 9:
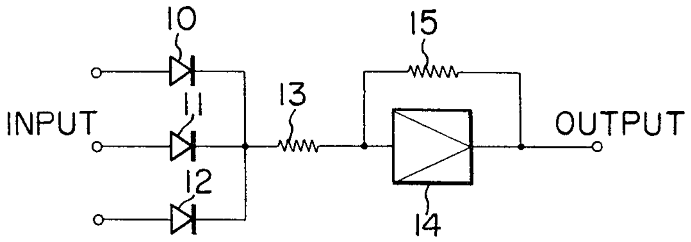
FIG. 9 is a diagram of an example of maximum value detecting circuits in the line width normalization circuit of FIG. 7.

The maximum value detecting circuit 5 may be implemented easily by utilizing the cutoff characteristics of diodes, in a way illustrated by way of example in FIG. 9. In the drawing, the reference numerals 10, 11 and 12 indicate the diodes connected to the inputs of the circuit, 13 indicates an input resistance, 14 indicates an operational amplifier, and 15 indicates a feedback resistance. Hence, if an input voltage to the diode 10 has a maximum value, the other diodes 11 and 12 will be cut off so that only the maximum voltage is applied to the input resistance 13. As a result, only the maximum value of the input voltages supplied is obtained at the output of each maximum value detecting circuit 5. The smallest of the maximum values thus obtained will be detected easily by a minimum value detecting circuit of similar construction belonging to the prior art.

The output of the minimum value detecting circuit 6 is supplied to a level detector 7 having a threshold value which represents the normal line width, so that this level detector 7 will produce a signal indicating whether the line width of the input pattern stored in quantized form in the two-dimensional register 3 is greater or smaller than the normal width.

Now, suppose that each of the aforementioned areas from which input signals are supplied to each of the sampling circuits 4 is determined so as to cover the line width of the quantized pattern in the two-dimensional register 3. In case a line of the pattern is located more or less exactly in that area, the quantized values therein will contain a high percentage of binary digits 1 (representing black spots) if the width of that line is large, and will contain a smaller percentage of binary digits 1 of the width is smaller. The corresponding sampling circuit 4 will produce a high output voltage in the former case and a low output voltage in the latter. It is possible, therefore, to detect the line width of the input pattern according to the output value of the sampling circuit 4. However, in event the line of the pattern is located more or less off the center of the aforesaid area, the output value of that sampling circuit 4 can provide no correct indication of the width of that line.

Figure 8:
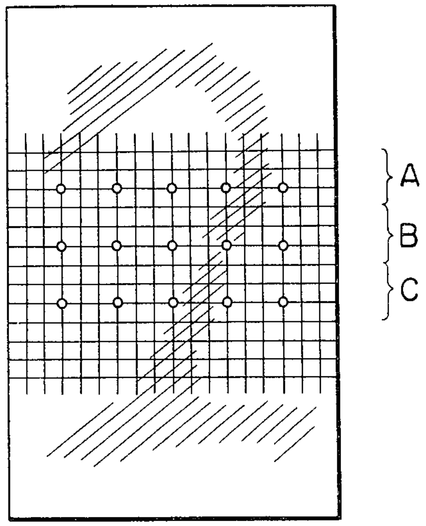
FIG. 8 is an explanatory diagram showing the latticed points on a quantized input pattern stored in a two-dimensional register of FIG. 7, the values at the latticed points being supplied as input signals to the line width normalization circuit of FIG. 7.

According to the present invention, this defect is overcome by the provision of a number of the sampling circuits 4 into which input signals are supplied from a number of equally divided portions of the quantized input pattern, as illustrated by way of example in FIG. 8. In this manner a line of the pattern will never fail to pass either one of these portions so that a maximum value will be produced by that one of the sampling circuits 4 into which have been supplied the signals from the portion in which a line of the pattern is located most neatly, the maximum value produced being detected by means of the maximum value detecting circuit 5.

It should also be taken into consideration, however, that any of the sampling circuits 4 will produce an inordinately great output when a branching or crossing point of two or more lines of an input pattern happens to be located in the portion from which input signals are supplied to that circuit. This defect, too, is eliminated according to the present invention by grouping the aforesaid equally divided portions into three regions A, B and C, for example, as illustrated in FIG. 8, and by obtaining a maximum value from each of correspondingly divided groups of the sampling circuits 4. The smallest of the maximum values thus obtained for the respective regions A, B and C is then detected by means of the minimum value detecting circuit 6. In this manner the presence of a branching or crossing point of two or more lines of a pattern in either of the regions A, B and C, causing a corresponding sampling circuit to produce an inordinately great output, is not likely to affect the correct detection of the line width of the pattern. The above three regions A, B and C, of course, are subject to various modifications, both in arrangement and in number, according to the size, shape or kind of the input patterns to be identified.

It will now be apparent that a difference, if any, between a normal line width and the line width of an input pattern thus obtained from its quantized values in the two-dimensional register 3 can be detected by means of the level detector 7 of FIG. 7. When the line width of the input pattern is found smaller than the normal width, the result of the detection may be fed back to the quantizing circuit 2 thereby to lower the quantization level of that circuit, or to the two-dimensional register 3 thereby to logically control the line width of the quantized pattern therein by means of the well known logical operations, as described in detail further below. If the line width of the input pattern is found greater than the normal width, on the other hand, the result can also be fed back to either of the quantizing circuit 2 and the two-dimensional register 3 thereby to raise the quantization level of the former or to decrease the line width of the quantized pattern stored in the latter.

Figure 10:
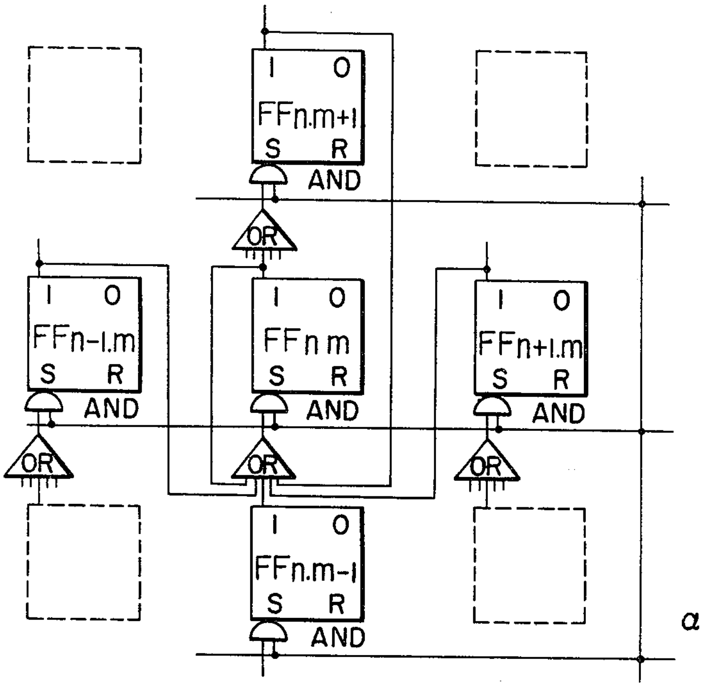
FIG. 10 is an enlarged block diagram showing in detail part of an example of the two-dimensional register provided in the line width normalization circuit of FIG. 7, the diagram being given for explanation, by way of example, of how the line width of a quantized input pattern in the two-dimensional register is controlled through logical operations.

By the way of illustration of how the line width of the quantized pattern in the two-dimensional register 3 of FIG. 7 is increased, for example, through the so-called logical operations, FIG. 10 shows some of a number of flip-flops provided in lines and columns therein. The reference character $FF_{n,m}$ indicates a flip-flop located at column *n*, line *m* of the register, and so forth. A line width normalizing signal *a*, supplied from the line width normalization circuit for increasing the line width of the pattern in this case, is applied to one of the input terminals of an AND gate of a set terminal S of each flip-flop thereby to open the AND gate. The other input terminal of the gate is connected with an OR gate, the input terminals of which are supplied with the outputs of the four immediately adjoining flip-flops and with the output of the flip-flop itself to which the OR gate belongs. Supposing now that the flip-flop $FF_{n,m}$ is already set and representing a black spot at the edge of a line of the pattern, then any one of the other flip-flops $FF_{n,m}$, $FF_{n,m}$, $FF_{n,m}$ and $FF_{n,m}$ will make its contribution for increasing the line width when set by the line width normalizing signal *a*. Of course, in this instance, the flip-flop $FF_{n,m}$ itself remains unaffected by that signal.

Although the degrees of the density of each input pattern has been represented only be binary digits 0 and 1 in the foregoing description of the line width normalization circuit, it will be obvious to those skilled in the art that such degrees can be represented by three or more values or even by analog quantities, without departing from the spirit of the present invention.

The sampled pattern is thus provided in optimal form for identification purposes since the pattern processing systems of the invention may be fed into an identification circuit of suitable design, as illustrated by way of example in FIG. 1.

Although the pattern processing systems of the present invention have been shown and described in the foregoing in their very specific aspects, it is assumed that the invention itself is not to be restricted thereby but includes obvious and reasonable equivalents within its scope defined only by the appended claims.

We claim:

1. A pattern processing system comprising sampling means including weighting/summing means for sampling a two-dimensionally represented pattern to produce sampled pattern signals corresponding to a sampled and blurred representation of said two-dimensional pattern, identifying means having said sampled pattern signals applied thereto for identifying said pattern by comparison with a plurality of predetermined patterns, detecting means having said sample pattern signals applied thereto for detecting the line widths of said two-dimensional pattern, and means connecting said detecting means to said sampling means for normalizing the line widths of said sampled and blurred representation of said two-dimensional pattern.

2. A pattern processing system as set forth in claim 1, in which said sampling means includes means for sampling said two-dimensional pattern at sampling points spaced to satisfy the equation:

$$0 \leq a \leq 0.637 \sqrt{\sigma_o^2 + ([b/1.4])^2},$$

where $2a$ = the width between sampling points of the pattern;
$2b$ = the line width of said pattern; and,
$\sigma_o$ = the standard deviation of the desired blurring.

3. A pattern processing system as set forth in claim 1, in which said sampling means comprises a plurality of summing amplifiers, each said summing amplifier including: an operational amplifier having an output terminal, and having a plurality of input terminals connected in common; a plurality of resistors respectively connected to said plurality of inputs; and, a feedback resistor connected at one end to said output terminal, and connected at its other end to said commonly connected input terminals.

4. A pattern processing system as set forth in claim 1, in which said weighting summing means comprises a plurality of digital adder circuits each having an input terminal for receiving a sample signal, and means connected to said digital adder circuit input terminals for weighting said sample signals according to the desired degree of blurring.

5. A pattern processing system comprising sampling means for producing electrical signals corresponding to a two-dimensional sample pattern, identifying means connected to said sampling means for identifying said sample pattern in response to said electrical signals, detecting means connected to said sampling means for detecting the line width of the sample pattern in response to said electrical signals, and means coupled between said sampling means and said detecting means for controlling said electrical signals to normalize a pattern line width represented by said electrical signals.

6. A pattern processing system comprising a source of input electrical signals representing a two-dimensional input pattern, quantizing circuit means having an input connected to said source, and having an output for producing quantized signals representing said input pattern in response to said input signals, two-dimensional register means having a plurality of outputs, and having an input connected to said quantizing circuit means, sampling circuit means connected to said register means for sampling said quantized signals at said respective register means outputs, said sampling circuit means including weighting/summing means for processing said sampled quantized signals, identifying means connected to said weighting/summing means for identifying said input pattern, and line width normalization circuit means having an input connected to said weighting/summing means for detecting a difference between a sampled line width and a reference line width, and having an output connected to said quantizing circuit means and said two-dimensional register means for controlling said quantized signals representing said input pattern.

7. A pattern processing system as claimed in claim 6, in which said line width normalization circuit comprises a plurality of maximum value detecting circuits each capable of detecting a maximum value possessed by the outputs supplied from each of equally divided groups of said sampling circuits, a minimum value detecting circuit for detecting the smallest of the maximum values detected by said plurality of maximum value detecting circuits, and a level detector which transmits a line width normalizing signal when the output of said minimum value detecting circuit supplied thereto is off a predetermined level.

8. A pattern processing system as claimed in claim 7, in which said line width normalization circuit has a feedback path to said quantizing circuit thereby to control the quantization level thereof.

9. A pattern processing system as claimed in claim 7, in which said line width normalization circuit has a feedback path to said two-dimensional register thereby to logically control the line width of the input pattern as represented by said quantized values stored therein.

* * * * *